United States Patent [19]

Hammond et al.

[11] 4,393,483

[45] Jul. 12, 1983

[54] TEST SET FOR A DIRECTIONAL COMMAND ACTIVE SONOBUOY SYSTEM (DICASS)

[75] Inventors: David C. Hammond, Hatboro; Stephen M. Elchenko, Pipersville; John M. Tralies, Norristown; Peter W. Verburgt, Perkasie; Leon R. Robinson, Morrisville, all of Pa.

[73] Assignee: The United States of America as represented by the Secretary of the Navy, Washington, D.C.

[21] Appl. No.: 291,000

[22] Filed: Aug. 7, 1981

[51] Int. Cl.³ .............................................. H04B 17/00
[52] U.S. Cl. ............................................ 367/13; 434/6
[58] Field of Search ............... 367/3, 4, 5, 13; 434/6, 434/7, 8, 9

[56] References Cited

U.S. PATENT DOCUMENTS

| | | | |
|---|---|---|---|
| 2,999,225 | 9/1961 | Gregg, Jr. et al. | 367/13 |
| 3,008,244 | 11/1961 | Lindley, Jr. | 434/8 |
| 3,153,770 | 10/1964 | Feistman et al. | 367/13 |
| 3,161,831 | 12/1964 | Pure | 367/13 |
| 3,363,045 | 1/1968 | Pommerening | 434/9 |
| 3,555,165 | 1/1971 | Ettenhofer | 367/13 X |
| 3,875,548 | 4/1975 | Acks | 367/13 X |
| 3,973,486 | 8/1976 | Pylant | 101/93.19 |
| 3,983,530 | 9/1976 | Johannessen | 367/13 |
| 4,043,175 | 8/1977 | Fredriksson et al. | 367/13 |
| 4,057,778 | 11/1977 | Bates et al. | 367/13 X |
| 4,092,627 | 5/1978 | Murdock et al. | 367/13 |

*Primary Examiner*—Richard A. Farley
*Attorney, Agent, or Firm*—R. S. Sciascia; Henry Hansen; Armand M. Vozzo, Jr.

[57] ABSTRACT

A DICASS test set utilizes a microcomputer to process infromation from an input and a down link section, generate the appropriate control logic for all the various electronic sections and format the appropriate output data for the output in uplink sections. A keyboard is provided from which an operator can input data the controller. A display and printer is provided to which the controller outputs information to the operator. The down link section consists of a UHF receiver, envelope detector, timer, filter bank, decoder, frequency counter. The uplink section consists of a reverberation simulator, a signal synthesizer, bearing, echo level and sea state controllers, three separate noise sources, multipliers and summing circuitry.

1 Claim, 13 Drawing Figures

Microfiche Appendix Included
(2 Microfiche, 100 Pages)

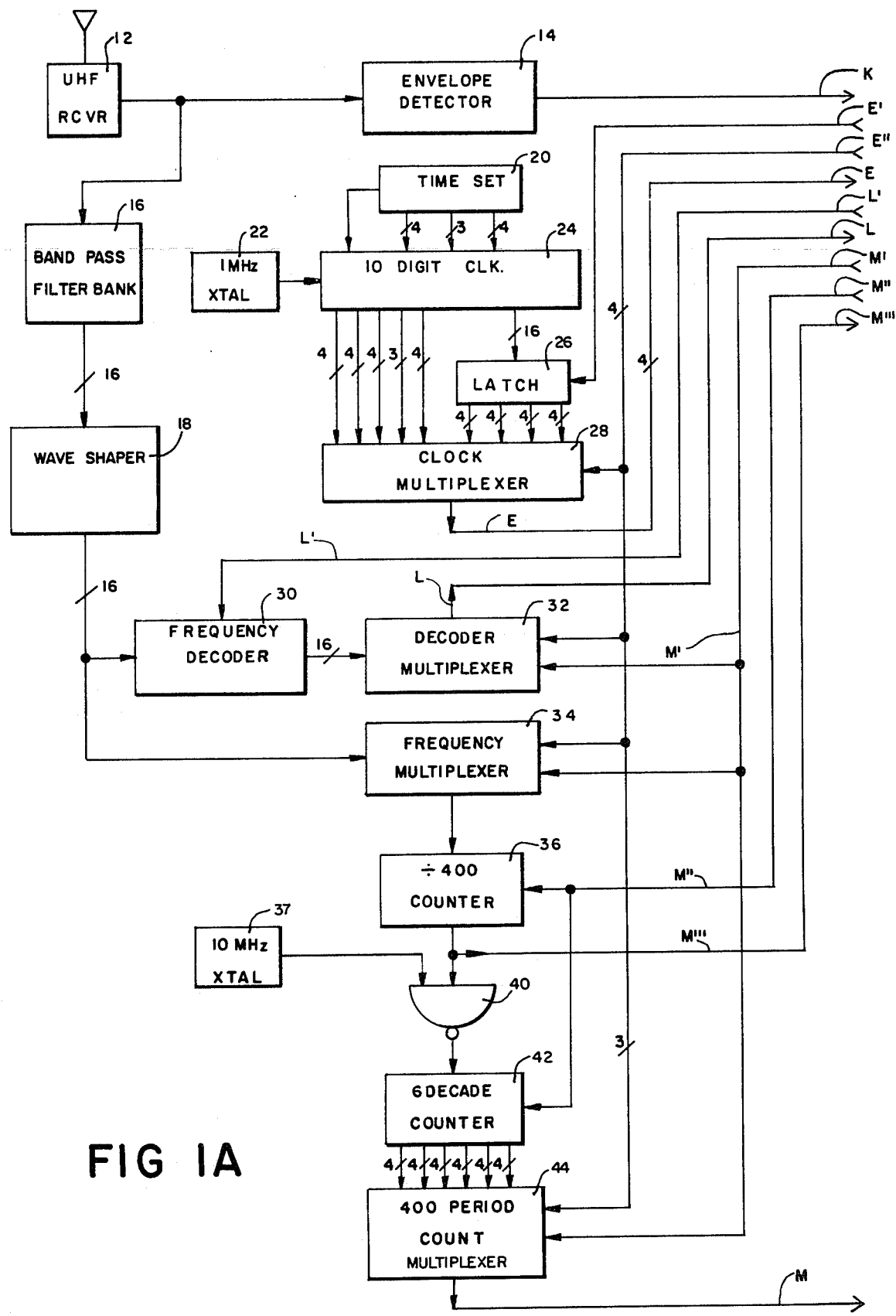
FIG IA

TEST SET FOR A DIRECTIONAL COMMAND ACTIVE SONOBUOY SYSTEM (DICASS)

STATEMENT OF GOVERNMENT INTEREST

The invention described herein may be manufactured and used by or for the government of the Unites States of America for governmental purposes without the payment of any royalties thereon or therefor.

APPENDIX

A microfiche appendix which consists of 100 pages is included in the application.

BACKGROUND OF THE INVENTION

This invention relates generally to apparatus and method for evaluating the performance of a sonobuoy-avionics system and particularly to a test set for evaluating the performance of the Directional Command Active Sonobuoy System (DICASS) avionics by verifying and recording downlink commands and generating uplink data with simulated target information.

As a result of sonobuoy complexity and therefor expense and the importance of reliable detecting and processing of information of critical no repeat target opportunities, it has become increasingly important to verify proper operation of a sonobuoy system. It is essential that operational and preflight checkout of the sophisticated integrated anti-submarine warfare systems be accurate and easy to utilize. No single piece of equipment is available that can monitor and simultaneously verify down link commands and provide uplink data for complete testing of the DICASS.

A receiver and a bank of filters each tuned to a particular frequency was utilized to monitor downlink commands but provided only limited capability. Prior knowledge of the channel to be commanded was required so as to select the proper filters. In order to verify the proper address and functional command, external test equipment including spectrum analyzers, storage scopes, time and frequency counters were required. Even with external test equipment, a series of the same commands were usually required before all parameters associated with the down link command could be properly measured and manually logged.

A Directional Frequency and Range (DIFAR) simulator had been utilized for checking DICASS uplink avionics only because DIFAR and DICASS use a similar uplink format. The DIFAR simulator, however, simulates a passive sonobuoy system and therefore does not provide a signal to resemble the actual DICASS acoustic performance.

SUMMARY OF THE INVENTION

Accordingly, it is an object of the present invention to evaluate the performance of the DICASS through continuous automatic monitoring of all channels. Another object of the present invention is to provide evaluation of the performance of the DICASS through verification and recordation of downlink commands and the generation of uplink data with simulated target information. A further object of the present invention is to provide acoustic data having simulated reverberation and target echo with proper pulse length, sonic mode, range, bearing and doppler modulated on the DICASS RF carrier. It is a still further object to provide a DICASS test set which is a highly interactive microprocessor based device having automated data entry and processing sequences. It is an object of the invention to provide a sonobuoy system and avionic test set which is easy to use, lightweight and can provide preflight and operational evaluation of acoustic performances. It is an object of the invention to provide a stand alone portable sonobuoy system acoustic avionic suite test set which has a unique feature for both analyzing and recording all transmitted DICASS commands and simulating a sonobuoy in an open ocean environment providing the total testing of DICASS. It is a further object of the present invention to provide a test set having flexibility for human interface via a key board, Display and Printer all controlled by a microprocessor. It is still a further object of the invention to provide a test set which can be placed in a simplex mode to monitor and record DICASS commands or into a duplex mode which permits responding to the command exactly as a sonobuoy with a target return. It is a further object of the invention to provide a test set for determining the channel and type of command, for analyzing the down link command for validity and for frequency and pulse length accuracy. It is a further object of the invention to provide a test set which displays and prints out the time the command was received, the DICASS channel number, mode selected and any detected inaccuracies associated with the receive command. Another object of the present invention is to provide a test set which allows the operator to choose a duplex mode in which he can determine the ocean environment according to sea state, and the target parameters according to echo level, range, bearing and speed.

Briefly, these and other objects are accomplished by the utilization of a microcomputer or controller which processes information from an input and a downlink section, generates the appropriate control logic for all the various electronic sections and formats the appropriate output data for the output and uplink sections. A keyboard is provided from which an operator can input data to the controller. A display and printer is provided to which the controller outputs information to the operator. The controller is connected to a downlink section consisting of a UHF receiver, envelope detector, timer, filter bank, decoder, and frequency counter. Also connected to the controller is the uplink section which produces all the signals required to simulate the DICASS composite signal consisting of simulated target echos generated at various ranges, bearings, dopplers, and amplitudes. The composite signal frequency modulates one of four VHF transmitter carrier frequencies. The uplink circuitry consists of a reverberation simulator, a signal synthesizer, bearing, echo level, and sea state controllers, three separate noise sources, multipliers and summing circuitry.

For a better understanding of these and other aspects of the invention, reference may be made to the following detailed description taken in conjunction with the accompanying drawings.

BRIEF DESCRIPTION OF THE DRAWINGS

FIG. 1A, 1B and 1C are block diagrams of the Directional Command Active Sonobuoy System test set according to the present invention;

FIGS. 2A-2J is a flow chart of processing steps utilized within the controller of the invention shown in FIGS. 1A-1C.

DESCRIPTION OF THE PREFERRED EMBODIMENT

Figure 1B:
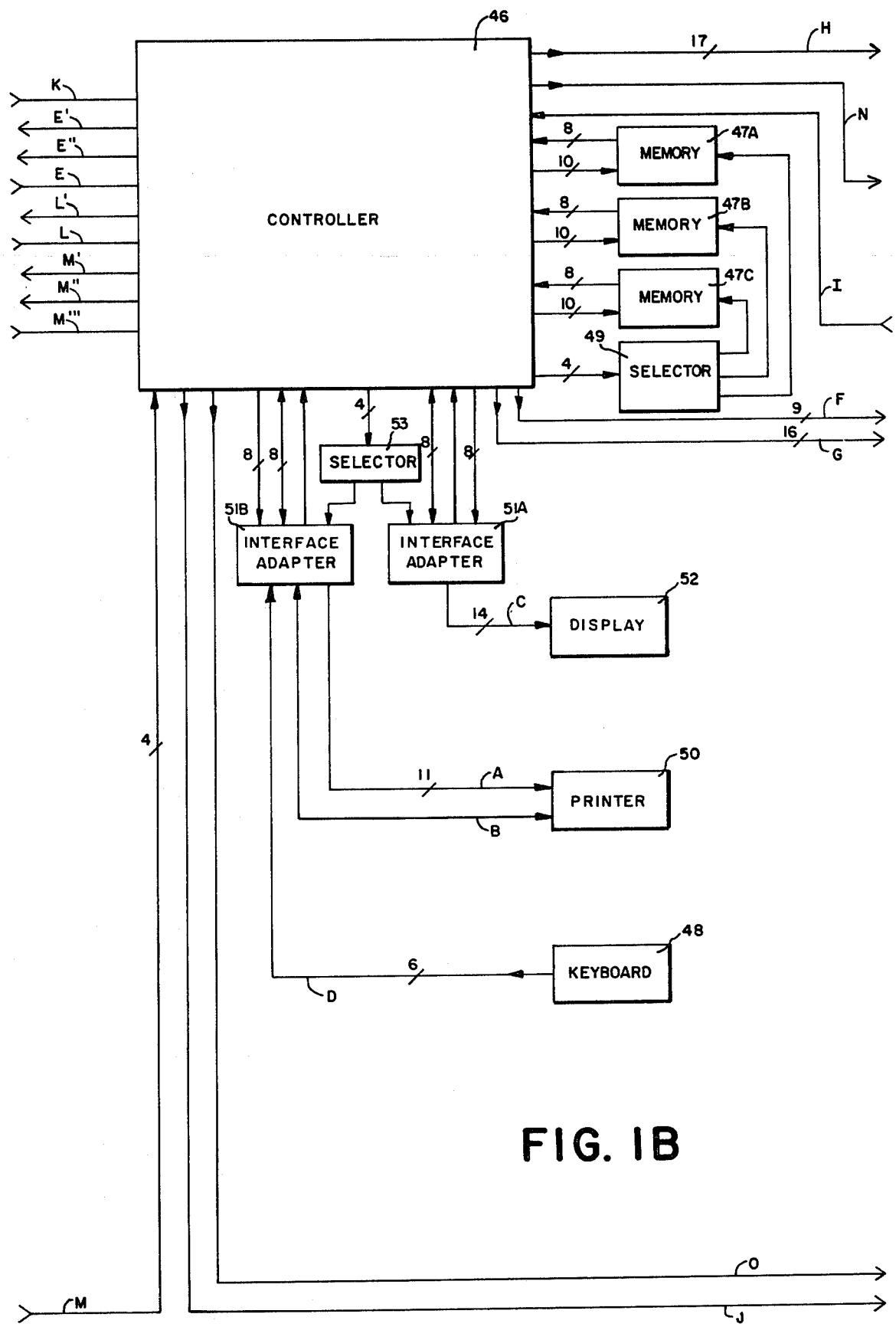

Referring to FIG. 1B there is shown a central processing unit or controller 46, in the present embodiment a Motorola Semiconductor Inc.'s M68MM01, which processes information from the uplink, downlink and input/output sections, generates control words, and formats output data to the uplink, downlink and input/output sections. Interface adapters 51A and B are connected to transmit signals C and A, and receive signals Band D respectively and to provide a controlled input and output interface with controller 46 and peripheral devices. A keyboard 48 is connected to send signal D comprising a six bit binary value for any one of 20 individual keyboard switches to adapter 51B for providing an operator with a way to input data into controller 46. A printer 50 is connected to receive signal A comprising digital words for 64 possible characters and send signal B comprising a control word and provides a way for controller 46 to print output information to the operator. A display 52 is connected to receive signal C from adapter 51A for displaying output data of up to sixty-four twenty digit alphanumeric characters. A selector 53 is connected to receive a four bit address word from controller 46 and to connect either adapter 51A and B depending on the address received. Memories 47A, B and C are connected to controller 46 for providing extended software storage. The microfiche appendix, lists in appropriate sequence the instructions, routines and other contents of the software. A selector 49 is connected to receive a four bit address word from controller 46 and to connect either memory 47A or B or C depending on the address received.

Referring now to FIG. 1A, there is shown a block diagram of the uplink and downlink sections of and the DICASS test set. A UHF, amplitude modulation, superheterodyne receiver 12 is tuned by front end filtering and a local IF oscillator to respond only to the carrier frequency utilized in the DICASS system. (Specified in MIL-S-81895(AS)). Envelope detector 14 is connected to receive the output of receiver 12 and to provide a high logic level interrupt signal K whenever receiver 12 output has exceeded a reference level. The controller 46 (FIG. 1B) is connected to receive signal K and provide an interrupt thereof. Signal K occurs at the beginning and the end of an address pulse and at the beginning and the end of a command pulse and causes controller 46 to output signals E' and E" to interrogate a timer comprising a time set 20, a crystal oscillator 22, a ten digit clock 24, a latch 26 and a clock multiplexer 28. Ten digit clock 24 is connected to receive time presetting data and a one megahertz frequency standard signal and to provide binary coded decimal time information for hours, minutes, seconds, tenths, hundredths, thousandths and ten thousandths.

Time set 20 is connected to clock 24 and provided mechanical and electromechanical operator interface devices such as thumbwheel switches and keyboard functions relating to stored preset time conditions by which an operator or user of the DICASS test set can preset various times into clock 24. Crystal oscillator 22 is connected to ten digit clock 24 and provides the stable one megahertz frequency standard for the timer. After clock 24 divides the one megahertz frequency down to one hertz, a modulo 60-second counter part of clock 24 converts the one hertz output to binary coded decimal BCD time information in seconds. The modulo 60-second counter is preset to 00 seconds by a keyboard function called TSET. When TSET is depressed and released, a low logic level pulse clears the modulo 60 second counter. A second modulo 60-minutes counter part of clock 24, converts the output from the previous modulo 60-second counter to BCD time information in minutes. This second modulo 60-minutes counter can be preset by the thumb wheel switches which are part of the time set 20 and also by a low logic level pulse provided by TSET. Binary coded decimal hours count from zero to eleven hours is generated by a modulo twelve-hours counter, also part of clock 24. A flip flop triggered by overflow from the hours counter provides a 24-hour count indication. Presetting of the modulo twelve-hour counter and flip-flop for hours count from zero to twenty-three hours takes place after decoding through the use of a 32-word programmable read only memory (PROM). Thumb wheel switches of time set 20 can address the PROM and gating logic to preset the hours count. Ten digit clock 24 provides the hours, minutes, seconds, tenths, units, tens and hundreds of milliseconds, as binary coded decimal information. A clock multiplexer 28 is connected to receive the BCD time data from clock 24 and latch 26 and enable signal E" and to sequentially select and output signal E comprising 10 digits of the time data to controller 46 whenever enable signal E" by software control is received from controller 46. Binary coded decimal time information in tenths, units, tens, and hundreds of milliseconds are required for accurate pulse length measurement. A latch 26 is connected to receive the tenths, units, tens and hundreds of millisecond times to compensate for their rapid rate of change. A latch enable signal E' which occurs immediately after signal K is provided from the controller 46 to cause latch 26 to hold the time data. All ten digits, tens of hours through tenths of milliseconds are read and sent to a printer 50 following the interrupt signal K corresponding to the beginning of an address. For the three following interrupts in the address/command sequence, only five digits corresponding to units of seconds through tenths of milliseconds are required to be read. Under software control, address, intergap, and command pulse lengths are calculated and verified to meet the standards set forth in specification MIL-S-81895 (AS) based on these five digit time data. A bandpass filter bank 16 is connected to receive the output of receiver 12 and separate the DICASS frequencies for purposes of decoding and frequency measurement. Bandpass filter bank 16 is comprised of sixteen filters. Twelve high Q ceramic filters for the 12 address and functional frequencies and four high Q active bandpass sonar filters. The gain of each filter of bank 16 is adjusted to provide a minimum of one-half volt peak in excess of the two and a half volt threshold values set for wave shaper 18. Shaper 18 is connected to receive the outputs of the sixteen filters of bank 16 for normalizing all filter outputs to a TTL logic level signal. A frequency decoder 30 comprised of 16 J-K flipflops configured in set/reset mode is connected to receive the output from shaper 18. Receiver 12 outputs which pass through the filter bandwidth of bank 16 and exceed the threshold of shaper 18 generate a pulse necessary for setting the appropriate J-K flip flop of frequency decoder 30. A decoder multiplexer 32 is connected to receive the sixteen output lines from decoder 30 and to provide a signal L indicative of the receipt of a valid frequency. Since receiver 12 output is simultaneously connected to envelope detector 14, an interrupt signal K is sent to controller 46. A five millisecond software generated delay elapses following the interrupt signal K allowing for filter response time, after which controller 46 by signal E" addresses decoder multiplexer 32 and reads the resultant output signal L. All multiplexing addressing, data reading, and storing is performed under software control. Software is utilized to analyze the decoder output, to validate downlink information and to determine channel and command information. If, for example, an invalid output is detected from decoder 32, an error message is typed on printer 50. A frequency multiplexer 34 is connected to receive the sixteen output lines from shaper 18 and signals E" and M" for providing an output signals. When signal L is received by controller 46 signal E" will permit multiplexer 34 to select the one of sixteen input lines from shaper 18 which is indicative of a valid received frequency. A frequency counting circuit, comprises a divide by four hundred counter 36, a six decade counter 42, a gate 40 and a 10 megahertz crystal oscillator 37. Divide by four hundred counter 36 is connected to receive the output signal from multiplexer 34 and signal M" from controller 46 and after four hundred input pulses to output a signal indicative of the end of period. Gate 40 is connected to receive the output signal from counter 36 and pulses at a ten megahertz rate and to provide and output signal only when counter 36 output signal is present. Ten megahertz crystal oscillator 37 is connected to gate 40 for providing pulses at the required rate. Six decade counter 42 is connected to the output of gate 40 and signal M" for counting and storing the number of pulses that are output from multiplexer 34 and providing six digits of time. Four hundred period count multiplexer 44 is connected to receive the output signal for counter 42 and signals E" and M' to provide a selected four bits of frequency count data. Prior to making a frequency count a disabling signal M' is connected to frequency multiplexer 34 from controller 46. Divide by four hundred counter 36 and six decade counter 42 are also cleared at the time by signal M". The controller 46 then addresses multiplexer 34 with signal E" to select the frequency to be counted using the digital number corresponding to the frequency designation of the filter bank 16. To initiate a count, controller 46 next enables counter 36, and counter 42 by signal M" and multiplexer 34 by signal M'. On the first leading edge output from frequency multiplexer 34, counter 36 enables gate 40 to pass the 10 MHZ XTAL 37 output to counter 42. After the 400th pulse output from multiplexer 34, counter 36 disables gate 40 which inhibits the 10 MHz XTAL 37 output from passing to counter 42 and provides frequency count done interrupt signal M'" to controller 46. Six decade counter 42 at this time has stored the time required to count 400 output pulses from frequency multiplexer 34 to 0.1 microsecond accuracy. This time is inversely proportional to the frequency count. Six decade counter 42 provides 6 digits of time from tens of milliseconds to tenths of microseconds as binary coded decimal information to 400 period count multiplexer 44 which serves as a 24 to 4 line multiplexer for reading the frequency count data. After receiving frequency count done interrupt signal M"", controller 46 disables frequency Multiplexer 34 and enables 400 period count Multiplexer 44 with signal line M'.

Using interrogatory signal E", the controller 46 addresses 400 period count multiplexer 44 under software control and reads the appropriate binary coded decimal time data signal M into controller 46.

Figure 1C:
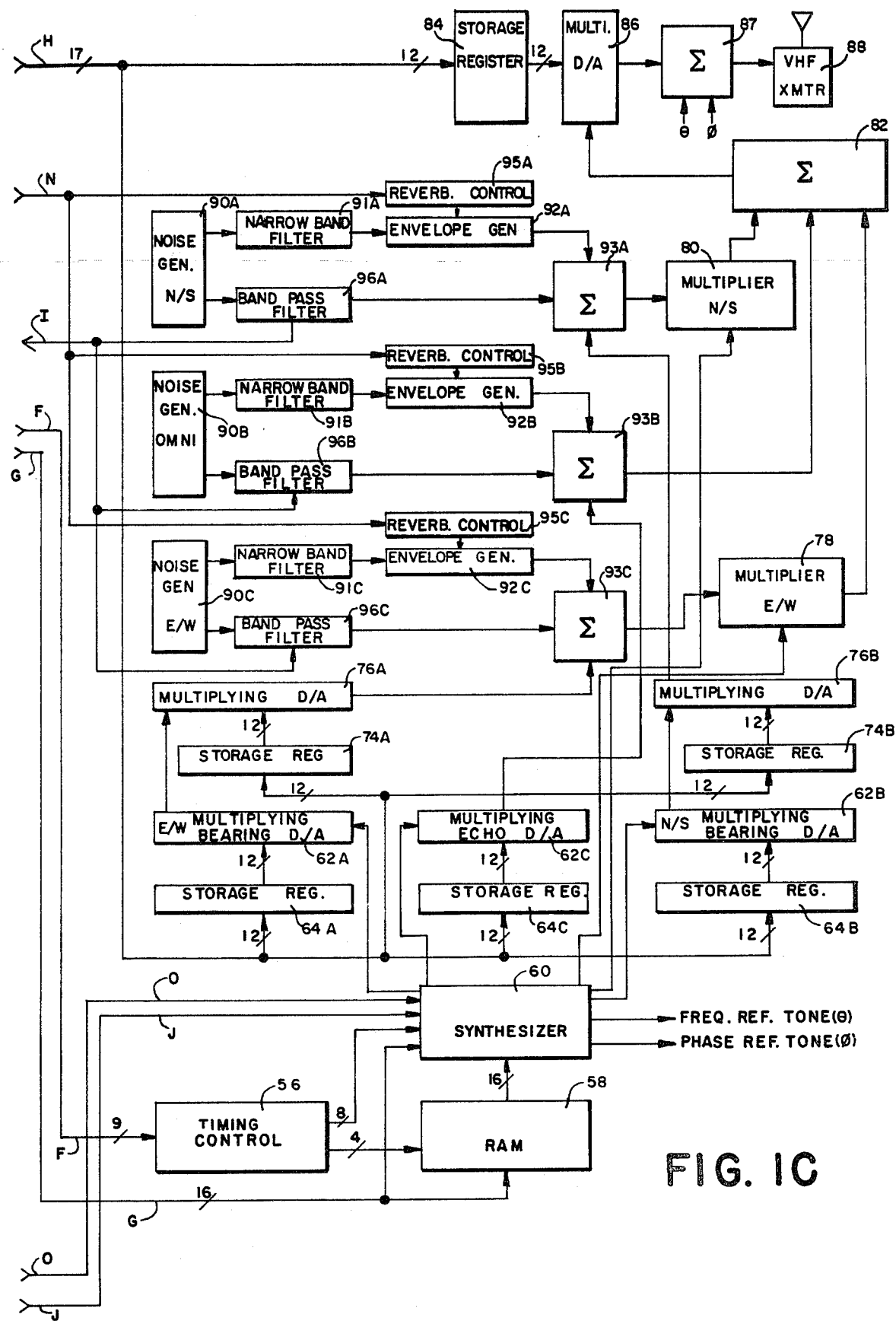
Figure 2A:
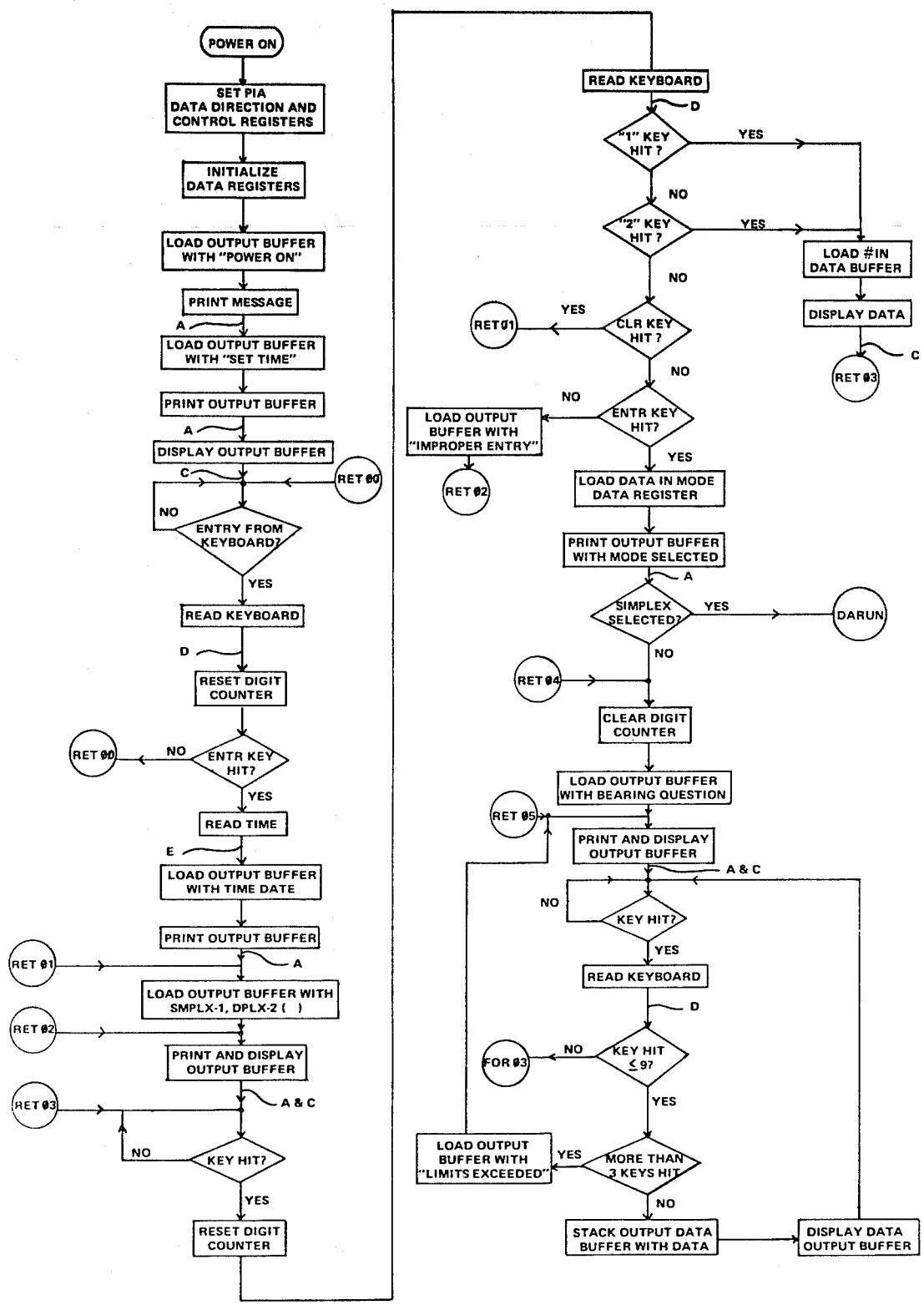
Figure 2B:
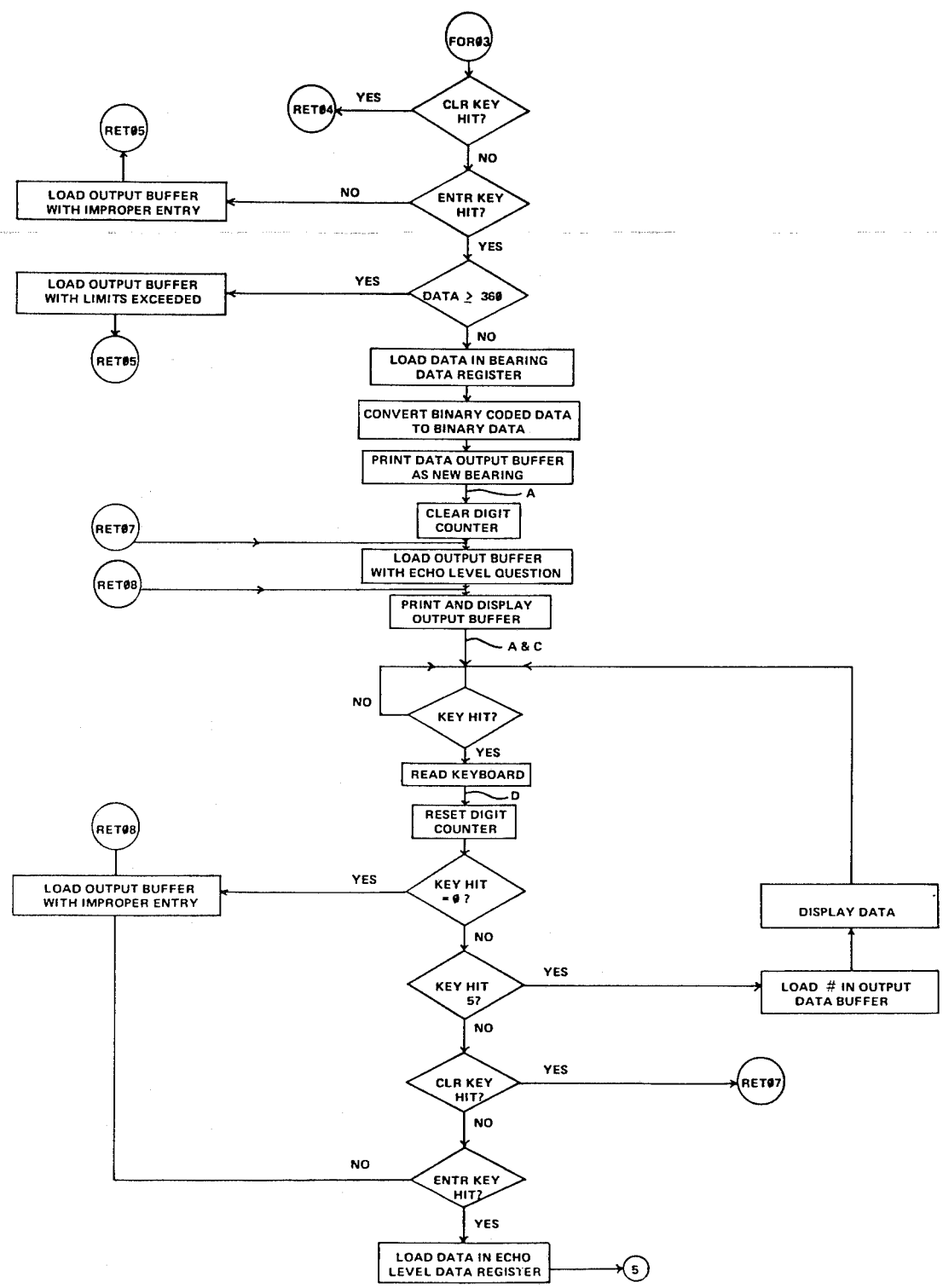
Figure 2C:
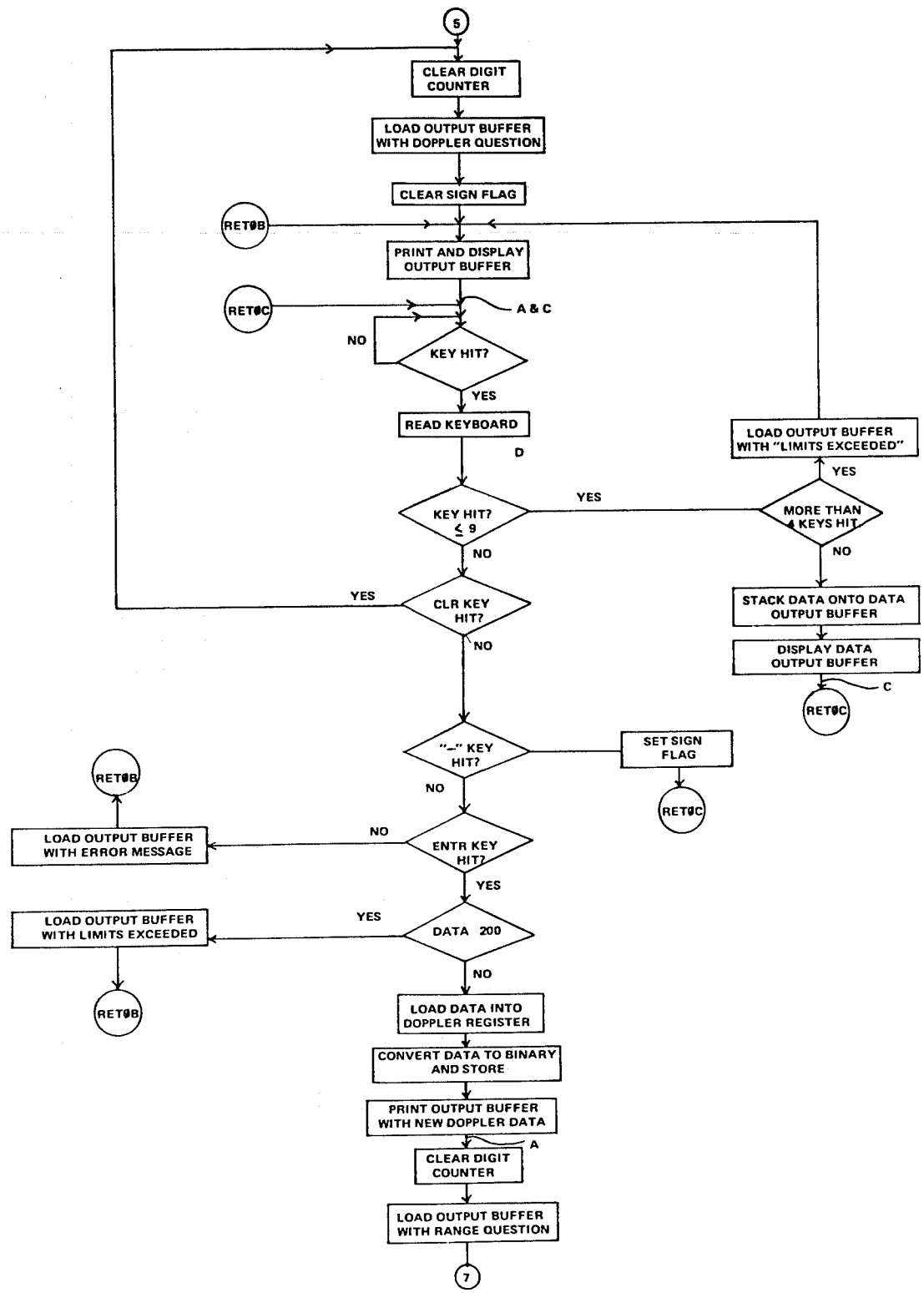
Figure 2D:
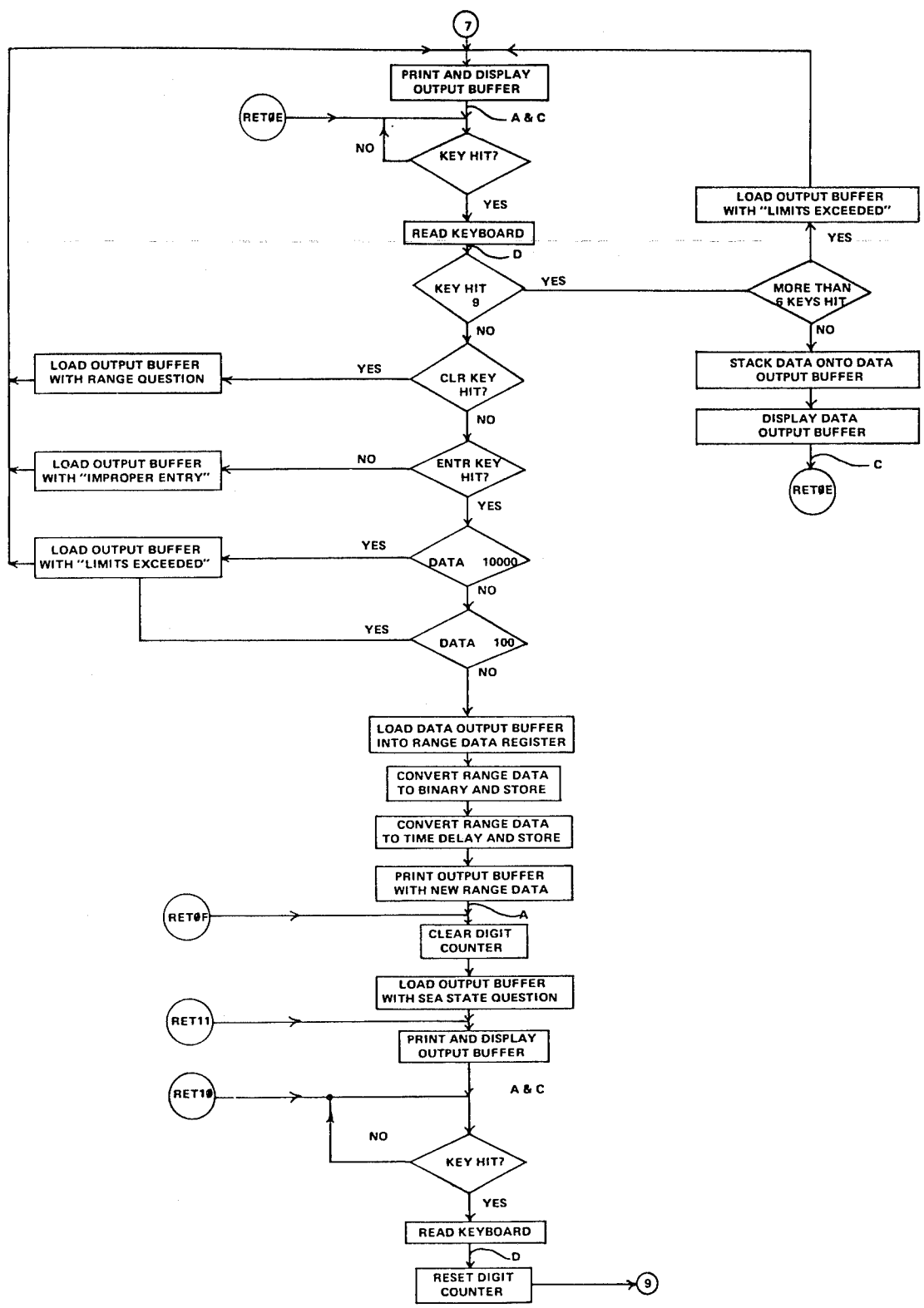
Figure 2E:
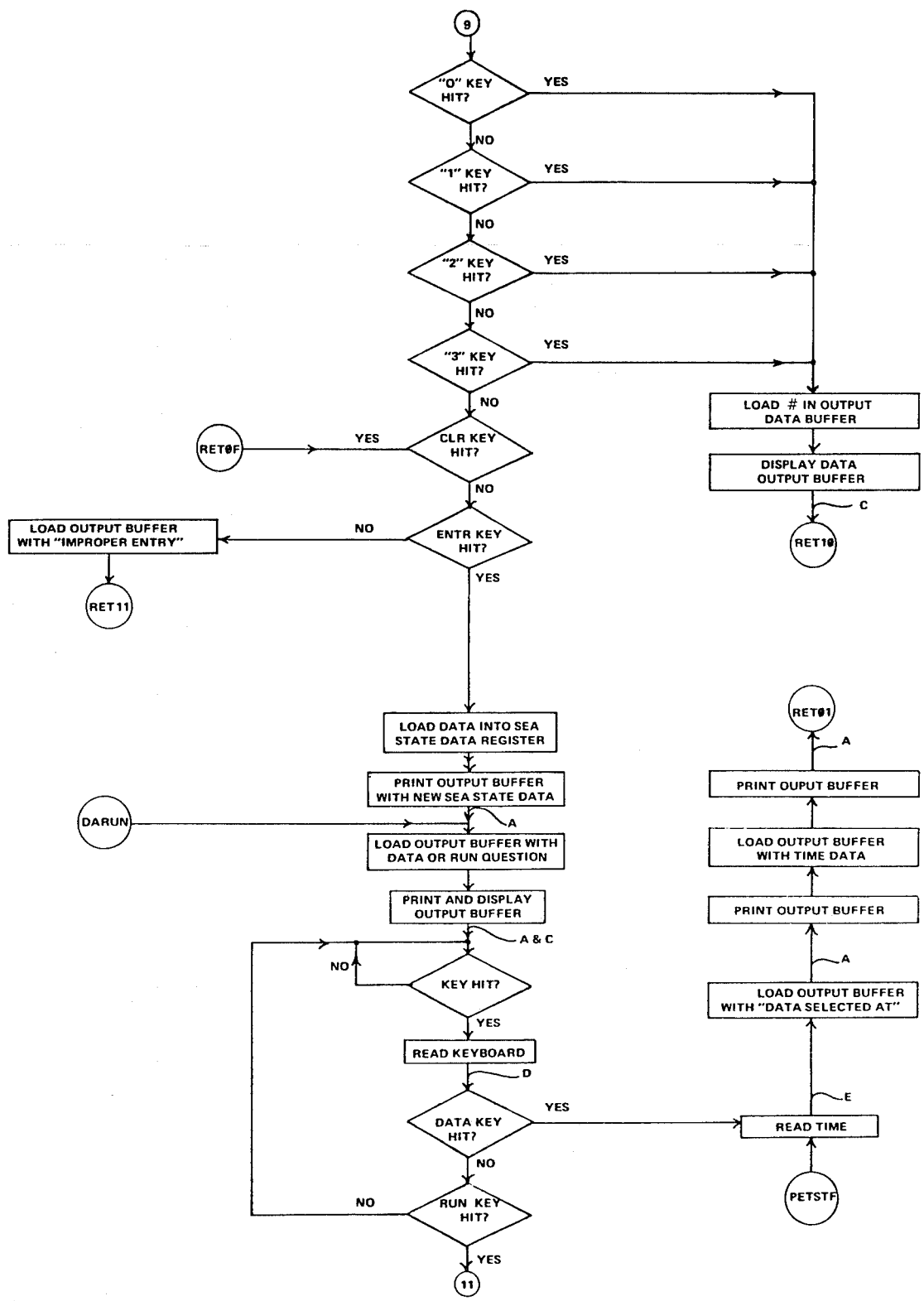
Figure 2F:
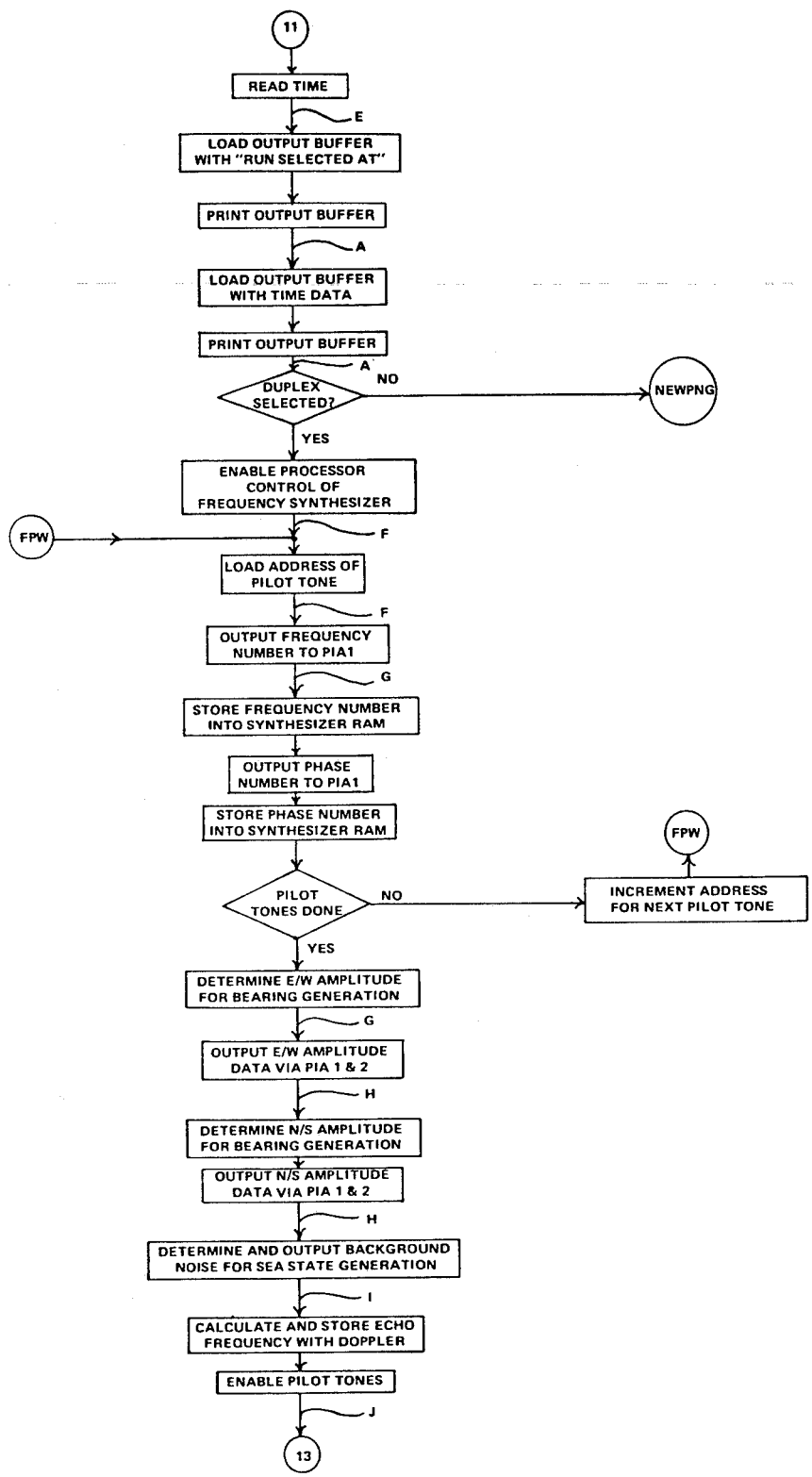
Figure 2G:
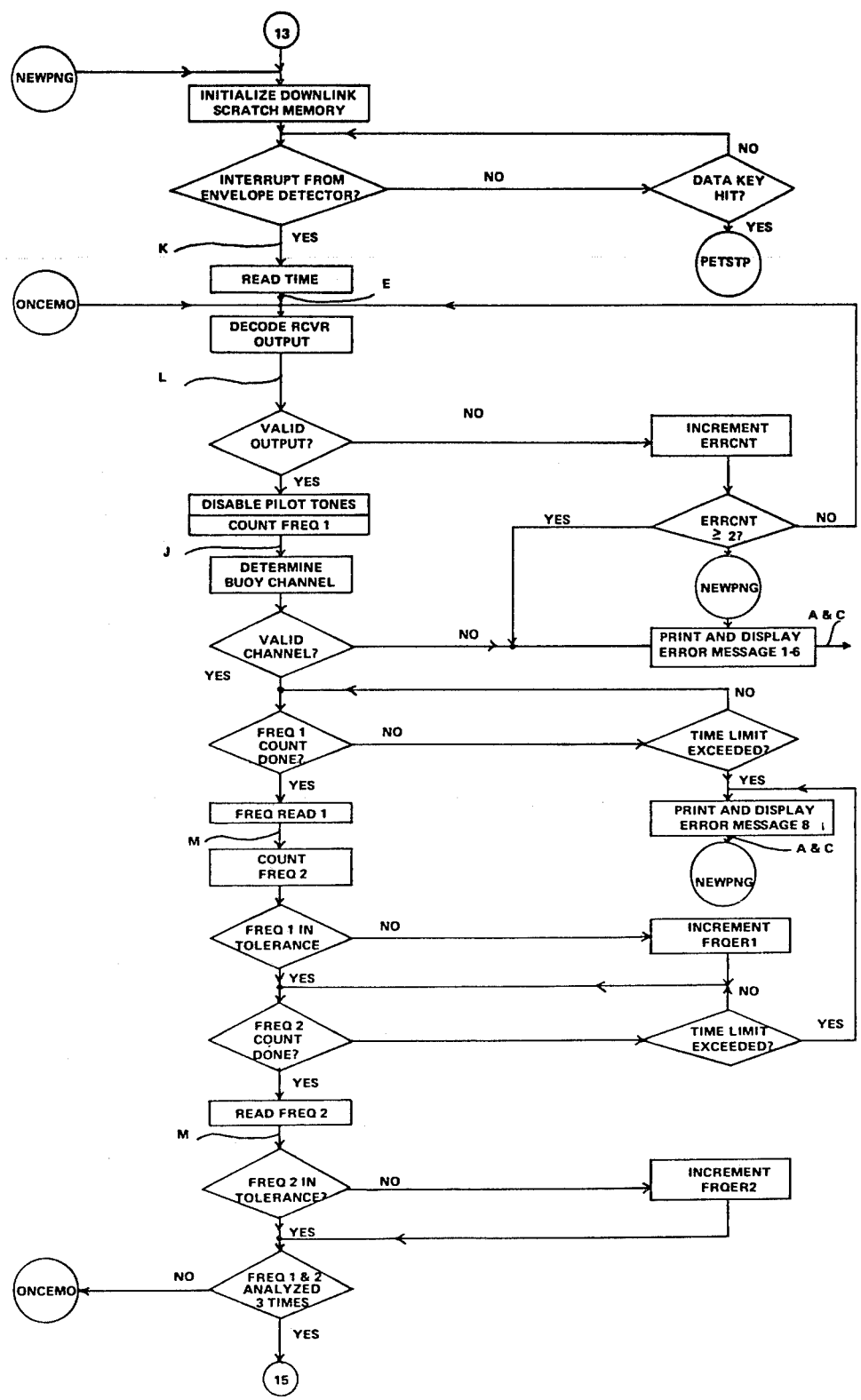
Figure 2H:
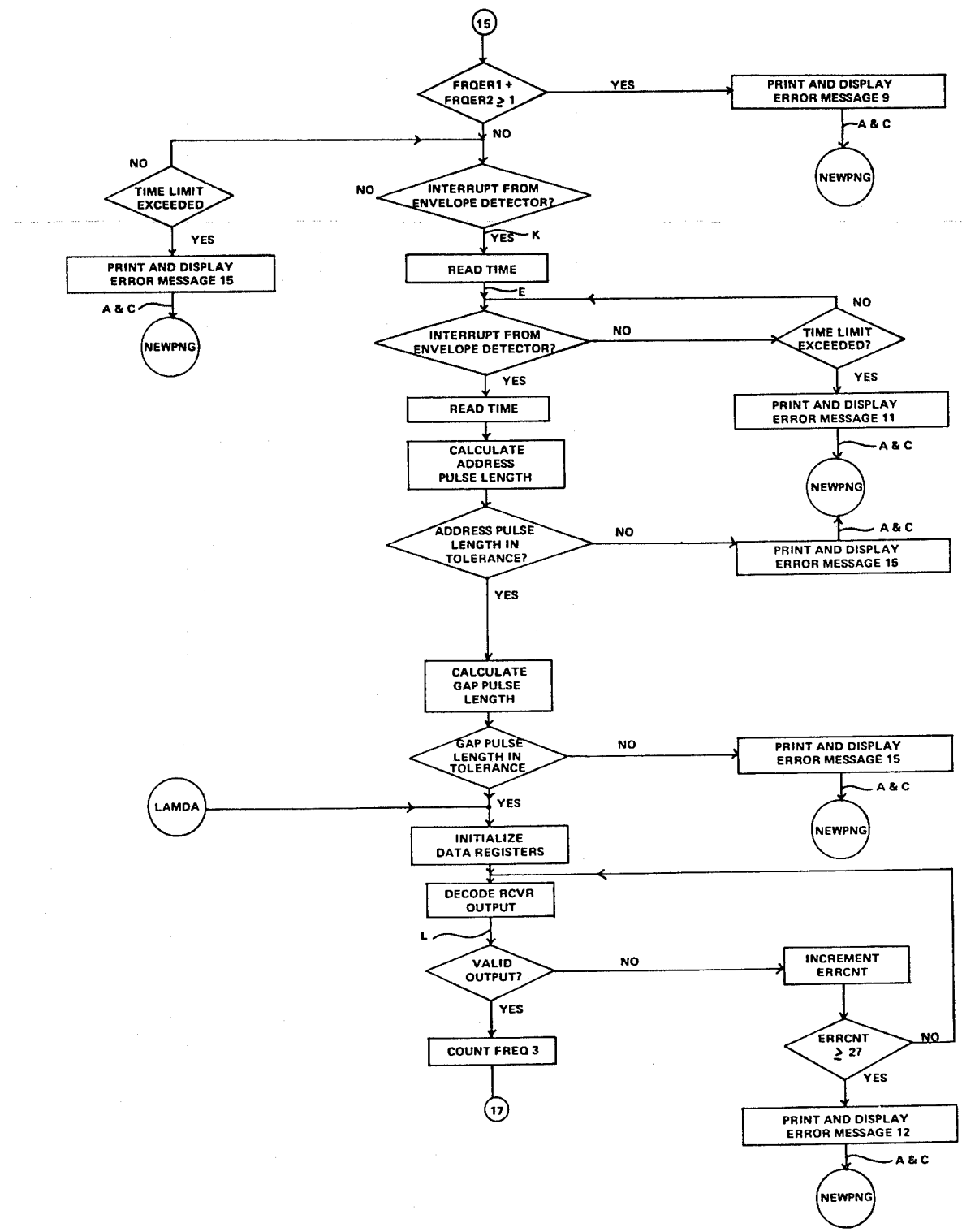
Figure 21:
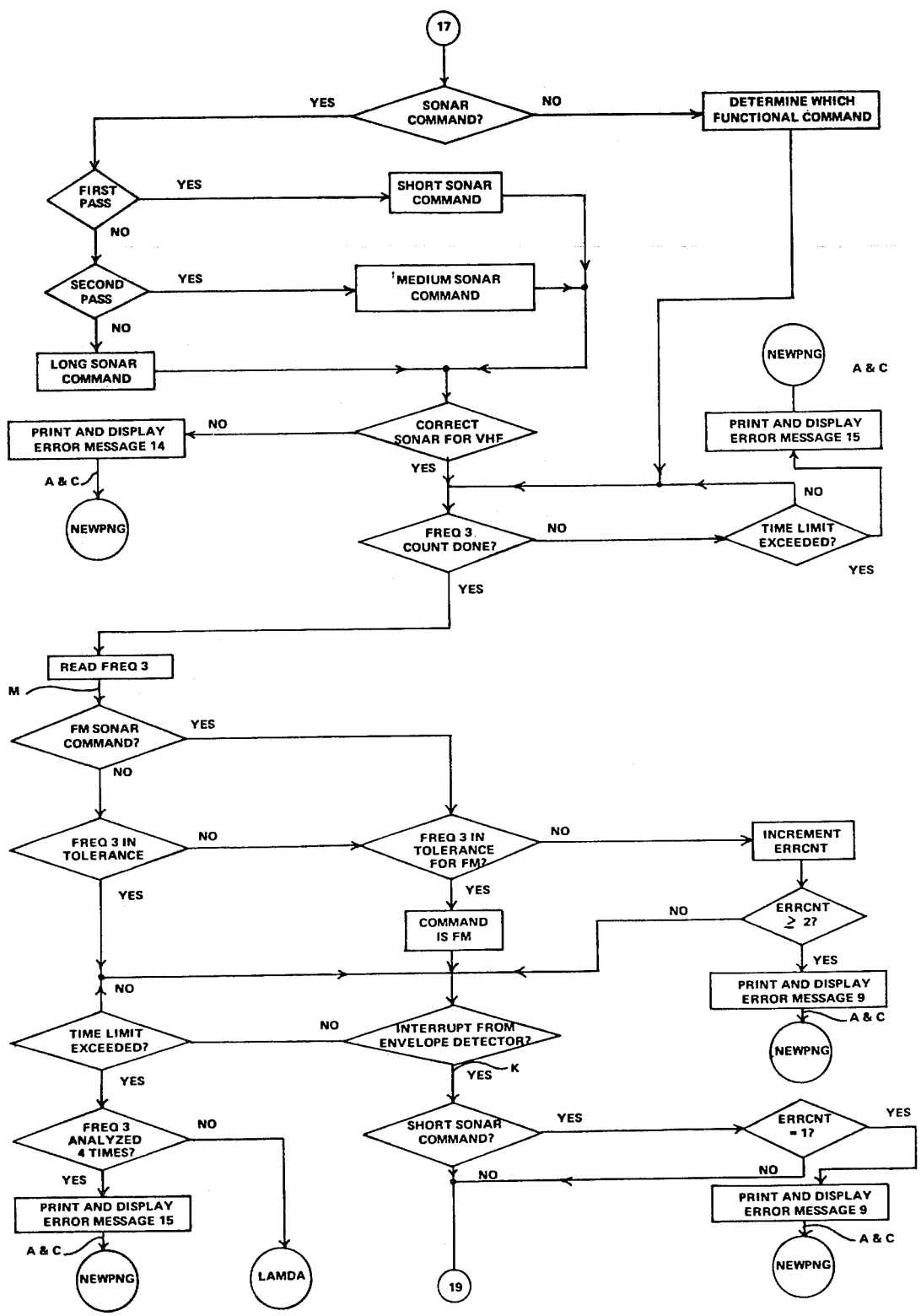
Figure 2J:
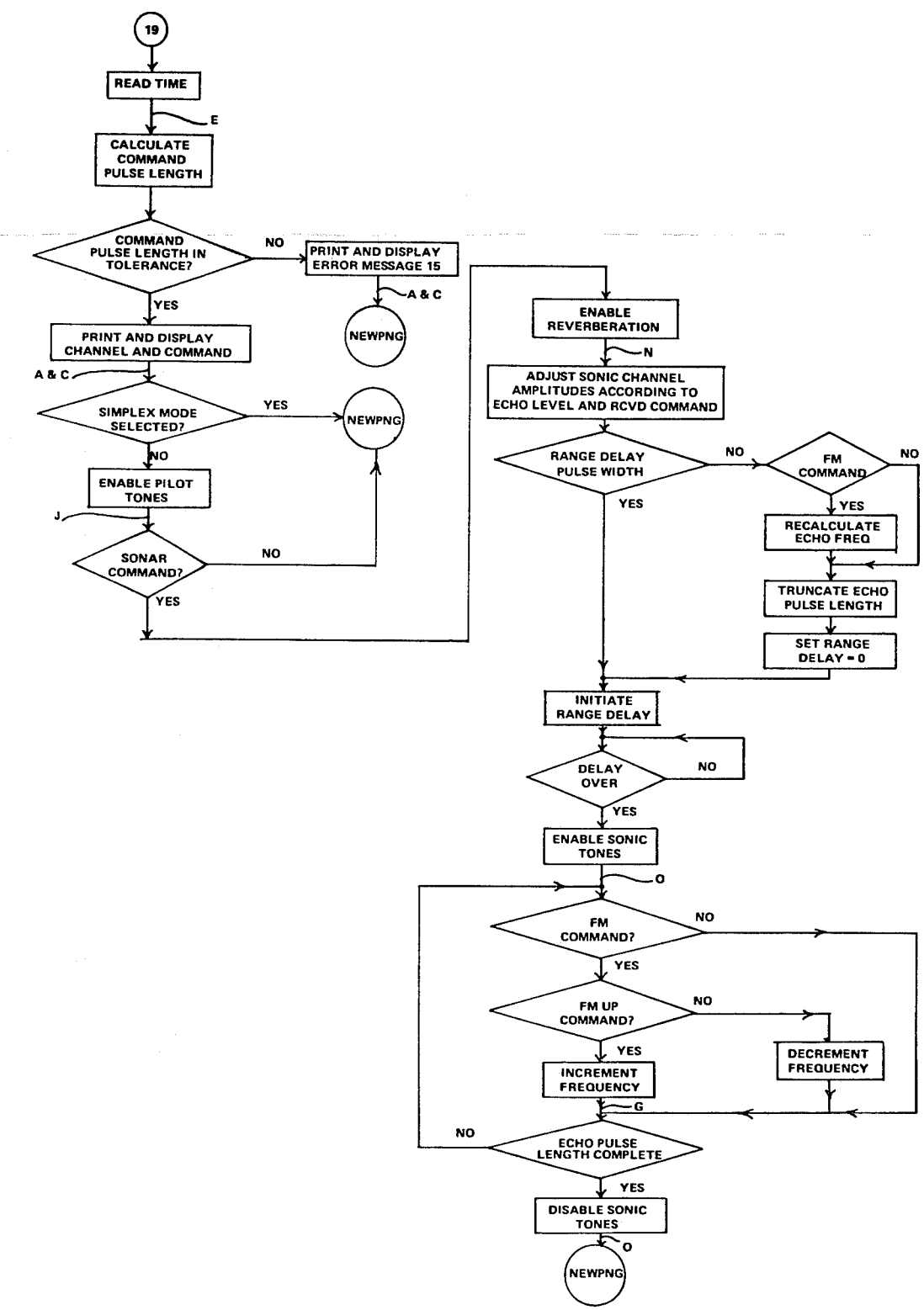

Referring now to FIG. 1C there is shown circuitry to produce a simulated DICASS composite signal as defined in MIL-S-81895(AS). Included in the composite signal are simulated target echos, generated with various ranges, bearings, dopplers, and amplitudes. The composite signal modulates one of four VHF transmitters.

A timing control 56 is connected to receive signal F comprising random access memory (RAM) address', phase and frequency read-write, sonic, pilot tone and update control signals from controller 46 (FIG. 1B). Timing control 56 provides for controlled loading of data and timing. A ram 58 is connected to receive a four bit digital word of address' and read-write controls from timing control 56 and is also connected to receive and store signal G comprising 16 bit digital words each being a binary value for one of seven different frequencies from controller 46. Because the seven frequencies are required, simultaneously and with precise control of relative phase, a time multiplexing scheme is used. Time multiplexing is achieved by storing the seven frequency binary values in ram 58 and sequentially routing them therefrom. The sixteen bit binary values are determined by controller 46 prior to being routed to ram 58.

A synthesizer 60 which generates seven frequencies with adjustable phase is connected to receive signal O and J comprising sonic and pilot tone enables respectively and signal G from controller 46, an eight bit control word from timing control 56 and the stored sixteen bit binary values sequentially from ram 58. After all binary values are sequenced from ram 58 a composite latching pulse from timing control 56 transfers the digital values from synthesizer 60.

Bearing multiplying digital to analog (D/A) converters 62A, and B are connected to receive the sonic tones or frequencies in analog form from synthesizer 60 and a twelve bit digital word multiplying constant for controlling the output amplitude. Storage registers 64A, and B are connected to receive and hold signal H the multiplying constant from controller 46 and to route the constant to converters 62A and B respectively. When signal O is high converters 62A and B output their respective sonic tones. Thus, echos with bearing information are provided by controlling the amplitude ratios between the sonic tones of converters 62A and B and maintaining a particular phase difference between converters 62A, B and C as provided by synthesizer 60.

Multiplying D/A converter 62C is connected to receive the sonic tones from synthesizer 60 and a multiplying constant. Multiplying D/A converters 76A and B are connected to receive the ratio adjusted and a multiplying constant sonic tone for providing absolute level amplitude adjustment. Storage registers 64C, 74A and B are connected to receive signal H comprising the multiplying constant from controller 46 and to hold and provide it to converters 62C, 76A and B respectively. Thus in a manner similar to controlling the bearing, the echo level is adjusted by controlling the amplitudes of the sonic tones in converters 62C, 76a and b.

There are three uncorrelated channels of simulated sea noise each having similar functional blocks. Noise generators 90A, B and C each provide pseudo-random noise for N/S, omni and E/W channels respectively. Narrow band filters 91A, B, and C are connected to receive the noise from generators 90A, B, and C respectively to provide high-Q filtering centered at 800 Hz with a bandpass of fifty hertz. Bandpass filters 96A, B, and C are also connected to the output of generators 90A, B and C respectively to provide a one thousand hertz bandpass centered at 800 Hz having a butterworth transfer characteristic with twenty-four decibel rolloff and the minus three decibel points at two hundred and fifty hertz and Fourteen hundred hertz.

Envelope Generators 92A, B, and C are connected to receive noise passing through filters 91A, B and C and an exponentially decaying pulse to provide the filtered noise to be amplitude modulated by the exponential decaying pulse. Reverberation controls 95A, B and C are connected to receive signal N, an enabling pulse, from controller 46 and to provide their exponentially decaying output pulses to envelope generators 92A, B and C respectively.

Summers 93A, B and C are connected to receive the output signal of envelope generators 92A, B and C, the bandpass filter noise from filters 96A, B and C and the output signals from converters 76B, 62C and 76A respectively and to provide uncorrelated output signals each comprising bandpass noise simulating ambient sea noise mixed with exponentially modulated narrow band noise simulating reverberation noise and echo signal.

Multiplier 78 and 80 are connected to receive the E/W and N/S carrier tone respectively from synthesizer 60 and the output signals from summer 93C and A respectively. Multiplier 78 and 80 are balanced modulators the outputs of which each comprise a suppresser carrier tone E/W and N/S respectively each tone amplitude modulated by the outputs of summers 93A and C respectively.

Summer or mixer 82 is connected to receive the output signals from multiplier 78 and 80, and the output signal from summer 93B. The signal from summer 93B is the omni signal and is summed in the proportions as defined in MILS-81895 (AS). Summer 82 provides an output signal whose signal to noise ratio (SNR) is based on echo levels for a sonar pulse mode with sea state 5 (according to Knudsen criteria) or the noise floor. Any amplitude variations from this reference level will change the noise corresponding to a prescribed sea state but the SNR is maintained.

Multiplying D/A converter 86 is connected to receive the output signal from summer 82 and a twelve bit multiplying constant and for providing an output signal comprising an amplitude adjusted input signal. This amplitude adjustment technique provides precise control for the changing of sea state levels.

Storage resister 84 is connected to receive signal H from controller 46 and to provide signal H to converter 86.

Summer 87 is connected to receive the output signal from converter 86, frequency reference tone ($\theta$) and phase reference tone ($\phi$) from synthesizer 60 to sum them and provide a composite signal.

VHF transmitter 88 is connected to receive the composite signal and to transmit it as modulation on an R.F. carrier to a remote receiving station.

In summary, operation of the foregoing embodiment of the present invention is as follows. A remote platform transmits an R.F. carrier amplitude modulated by the DICASS command format consisting of address and command or sonic tones each having discrete time duration. The receiver in the test set demodulates the R.F. carrier and passes the modulation to be filtered and decoded to determine the channel. Frequency measurement of the determined channel is performed and validated. Simultaneously, the pulse widths are measured by a timer means and subsequently validated. The above discussed functions are performed under software control by controller 46. User input and output data transfer function through interfaces pheripheral are also performed by controller 46.

As a function of the received DICASS signals and user designated target and ocean parameters the controller formats a composite signal representing simulated DICASS uplink signals.

The simulated signal is transmitted back to a remote platform via one of four VHF sonobuoy transmitter channels.

At power turnon, or whenever the rest key is pushed on keyboard 48, the following chronological series of events occur. Display 52 cues the operator to set time. The printer 50 records the power on condition followed by the set time cue. The time of day clock can be set to the hours and minutes selected on some wheel switches of time set 20 upon activation of the TSET key on keyboard 48. The clock can be set at this time or at any time that the test set is operating. Actuation of the enter key advances the menu pointer and the present time of the clock is printed out. Display 52 as well as printer 50 now interrogates the user as to which mode of operation the test set is to be operated, simplex or duplex. The simplex mode monitors and verifies all downlink commands, and records the time of command, the channel commanded, the type of command or any out of tolerance commands with respect to the DICASS specification. The duplex mode augments the simplex mode in that a composite signal containing a simulated echo is transmitted on an R.F. data uplink. The duplex mode supersedes the simplex mode in that no further analysis of down link commands can be accomplished until the simulated echo is returned.

After initial power on, the duplex mode is preselected. The user at this point has three options available. (A) He can select the simplex mode by pushing the key "one" on keyboard 48 followed by the enter key. The selected simplex mode is now verified in the printout by noting that the number one is now within the paranthesis and the line data or run ? is printed out. The user can now either change his choice of modes by selecting the data key or run the test set in the simplex mode by selecting the run key. The users selection is printed out with the current time. If the data key is selected the interrogation menu is restarted. If the run key is selected, the display indicates simplex mode and the test set awaits DICASS down link commands. (B) The user can operate the test set and the duplex mode utilizing the preset echo parameters by selecting the run key. The user selection is then printed out with the current time and the display indicates the duplex mode. The test set will now monitor and respond to DICASS down link commands. (C) While in the duplex mode, the user can change any echo parameter before proceeding. This can be accomplished by two methods. The user can select any parameter to be changed or observed by pushing the appropriate parameter key, or stroll through the parameter menu by pushing the enter key. The sequence of parameters in the scroll are as follows: bearing, echo level, doppler, range, sea state data or run. Following the selection, the printer and display will indicate the present value of the parameter. The user can change the value by selecting the appropriate numeric key followed by the enter key. If the allowed values for the parameters are selected, the printer records the change and prints out the next parameter in the menu with its current value. Improper entry or limits exceeded will be printed and displayed whenever an incorrect entry is made. To correct the entry, push clear key and reenter the proper values. The menu of parameters can be interrogated and corrected in any random of fashion prior to pushing the run key. Selecting the run key enables the test set to operate in the mode selected. Selecting the data key will halt the operation of the test set and allow for echo parameter or mode changes during the standby state when the test set is waiting for a downlink command. The data key selection is recorded along with the current time and the parameter menu is restored. The reset key aborts the operation of the test set and restarts the test set in the same manner as the power turnon condition.

Some of the many advantages of the invention can now be readily apparent. For example, the present invention evaluates the performance of the DICASS through continuous automatic monitoring of a plurality of channels. It provides evaluation of the performance of the DICASS through verification and recordation of downlink commands and generates uplink data with simulated target information. The uplink signal provides simulated reverberation and target echo with proper pulse length, sonic mode, range, bearing and doppler modulated on the DICASS R.F. carrier. The test set has the advantage to provide operator interactivity with a microprocessor base device having automated data entry and processing sequences. The test set is a stand alone portable system, is easy to use, lightweight and can provide preflight and operational evaluation of acoustic performances. The test set has the advantage of being used in either a simplex mode to only monitor and record DICASS commands or into a duplex mode permitting it to also respond to the command exactly as a sonobuoy would with a target return.

The test set displays and prints out the time command was received, the channel number, the DICASS mode selected and any detected inaccuracies associated with the received command.

Obviously, many modifications and variations of the present invention are possible in light of the above teachings. It is therefore to be understood that within the scope of the appended claims, the invention may be practiced otherwise than as specifically described.

We claim:

1. An apparatus for testing an active target-detecting sonobuoy system comprising:

downlink means for categorizing the modulation of a first radio frequency carrier signal thereby producing digital data indicative of the frequency and pulse width of the modulation;

uplink means coupled to said downlink means for generating a second radio frequency carrier signal modulated by simulated target and environmental information;

controller means interconnected between said downlink and uplink means and containing a stored program for automatically analyzing said digital data to validate frequency and pulse width of the modulation in accordance with specified parameters and for producing an output signal indicative of the analysis results;

peripheral input means connected to said controller means for providing instructional information related to operational parameters of the system; and peripheral output means connected to said controller means for displaying instructional information related to the operation of the system and the output signal of said controller means.

* * * * *